(12) United States Patent
Thiebes et al.

(10) Patent No.: US 11,965,056 B2
(45) Date of Patent: Apr. 23, 2024

(54) DRYING AGENT FOR MOISTURE-CURING COMPOSITIONS

(71) Applicant: Covestro Intellectual Property GmbH & Co. KG, Leverkusen (DE)

(72) Inventors: Christoph Thiebes, Cologne (DE); Florian Stempfle, Cologne (DE); Klaus Lorenz, Dormagen (DE); Ute Nattke, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 539 days.

(21) Appl. No.: 17/267,530

(22) PCT Filed: Aug. 14, 2019

(86) PCT No.: PCT/EP2019/071840
§ 371 (c)(1),
(2) Date: Feb. 10, 2021

(87) PCT Pub. No.: WO2020/038804
PCT Pub. Date: Feb. 27, 2020

(65) Prior Publication Data
US 2021/0317253 A1     Oct. 14, 2021

(30) Foreign Application Priority Data

Aug. 21, 2018 (EP) .................................. 18189954

(51) Int. Cl.
| | |
|---|---|
| C08G 18/28 | (2006.01) |
| C08G 18/10 | (2006.01) |
| C08G 18/24 | (2006.01) |
| C08G 18/48 | (2006.01) |
| C08G 18/73 | (2006.01) |
| C08G 18/75 | (2006.01) |
| C09D 175/08 | (2006.01) |
| C09J 175/08 | (2006.01) |
| C09K 3/10 | (2006.01) |

(52) U.S. Cl.
CPC .......... *C08G 18/283* (2013.01); *C08G 18/10* (2013.01); *C08G 18/246* (2013.01); *C08G 18/4825* (2013.01); *C08G 18/4866* (2013.01); *C08G 18/73* (2013.01); *C08G 18/755* (2013.01); *C09D 175/08* (2013.01); *C09J 175/08* (2013.01); *C09K 3/1021* (2013.01); *C08G 2190/00* (2013.01); *C09K 2200/065* (2013.01)

(58) Field of Classification Search
CPC .............................. C08G 18/10; C08G 18/283
See application file for complete search history.

(56) References Cited

U.S. PATENT DOCUMENTS

| | | | |
|---|---|---|---|
| 3,971,751 | A | 7/1976 | Isayama et al. |
| 5,041,494 | A | 8/1991 | Franke et al. |
| 5,158,922 | A | 10/1992 | Tinney et al. |
| 5,364,955 | A | 11/1994 | Zwiener et al. |
| 5,470,813 | A | 11/1995 | Le-Khac |
| 6,207,766 | B1 | 3/2001 | Doi et al. |
| 6,255,537 | B1 | 7/2001 | Hayashi et al. |
| 2003/0232949 | A1 | 12/2003 | Roesler et al. |
| 2004/0010076 | A1 | 1/2004 | Sugiyama et al. |
| 2008/0125529 | A1 | 5/2008 | Austermann et al. |
| 2017/0101564 | A1 | 4/2017 | Choffat |

FOREIGN PATENT DOCUMENTS

WO    2018015552 A1    1/2018

OTHER PUBLICATIONS

International Search Report for related Application No. PCT/EP2019/071840, dated Nov. 12, 2019, 4 pages.

*Primary Examiner* — Wenwen Cai
(74) *Attorney, Agent, or Firm* — The Webb Law Firm

(57) ABSTRACT

The invention relates to a polymer composition that can be produced by (a) reacting an NCO-reactive polymer having exactly one NCO-reactive group per molecule, with a diisocyanate, the molar ratio of the diisocyanate molecule to the NCO-reactive groups of the NCO-reactive polymer being at least 2:1; and (b) reacting the residual NCO groups in the reaction product from step a) with an NCO-reactive silane. The invention also relates to a moisture-reactive composition containing said polymer composition, to methods for producing the polymer composition, and to moisture-reactive compositions containing said polymer composition. Finally, the invention relates to the use of the polymer composition as a drying agent for moisture-curing adhesives, sealants and coating agents.

17 Claims, No Drawings

DRYING AGENT FOR MOISTURE-CURING COMPOSITIONS

CROSS-REFERENCE TO RELATED APPLICATION

This application is a national stage application under 35 U.S.C. § 371 of PCT/EP2019/071840, filed Aug. 14, 2019, which claims the benefit of European Application No. 18189954.3, filed Aug. 21, 2018, each of which is incorporated herein by reference.

FIELD

The invention relates to polymer compositions containing silane-functional polymers, to a process for producing same and to their use as a drying agent for moisture-curing compositions, especially sealants, adhesives and coating materials. The invention also relates to moisture-curing compositions comprising these polymer compositions and to process for producing same.

BACKGROUND

"Silane-functional polymers" refers to polymers which have been modified with at least one silane group, but preferably with two or more silane groups. "Silane group" in this case refers to an organosilicon group having at least one organic radical bonded via an Si—O bond, for example an alkoxy or acyloxy group. Such silane groups are also known to those skilled in the art as organoalkoxysilane or organoacyloxysilane. Silanes have the property of hydrolyzing on contact with moisture to afford organosilanols, that is to say of forming groups having at least one silanol group (Si—OH group), and of polymerizing as a result of subsequent condensation to afford organosiloxanes. In the case of silane-functional polymers, this polymerization leads to crosslinking of the polymers to give a wide-meshed network. This process is also referred to as curing. Because of this capacity for further crosslinking, silane-functional polymers are also referred to as prepolymers.

Silane-functional polymers can be obtained, for example, by reacting isocyanate group-containing (NCO-containing) polymers with secondary aminosilanes. Such products are mentioned, for example, in EP 2 952 533 A1. Here, the isocyanate groups are completely reacted with the amino groups of the aminosilanes to form urea groups, so that no free isocyanate groups remain. The isocyanate group-containing polymers are usually obtained by reacting diisocyanates with high molecular weight polyols. This preferably involves reacting diisocyanates with diols.

The molar ratio of NCO groups from the diisocyanates to the hydroxyl groups (OH groups) of the high molecular weight polyol (NCO:OH ratio) in this case determines the composition of the NCO-containing polymers. When reacting diisocyanates with diols, an NCO:OH ratio of 2:1 is ideally chosen so that, on a statistical average, it is always the case that two diisocyanates react with one diol and a product having exactly two free isocyanate groups is formed. By-products obtained here are relatively high molecular weight polymers which are formed by reaction of two or more diols with more than two diisocyanates. An NCO:OH ratio lower than the ideal value of 2:1 promotes the formation of relatively high molecular weight polymers, whereas a greater NCO:OH ratio results in a greater proportion of free diisocyanates in the product mixture. The former has the disadvantage that the viscosity of the uncrosslinked NCO-containing polymer and, as a result, that of the silane-functional polymer produced therefrom, increases, meaning that it is more difficult to process this silane-functional polymer further into a sealant or adhesive composition. In addition, such products have the disadvantage that any unreacted and therefore excess diisocyanate present has to be removed in a complex manner (for example by distillation). For this reason, NCO-containing polymers for the production of silane-terminated polymers are typically produced with an NCO:OH ratio in the range from 1.5:1 to 2.2:1.

EP 2 952 533 A1, for example, discloses the production of silane-functional polymers by reacting polyoxypropylene diol with isophorone diisocyanate (IPDI) at an NCO:OH ratio of 2.1:1 and subsequently reacting the reaction product with diethyl (N-(3-triethoxysilylpropyl)aminosuccinate or diethyl (N-(3-trimethoxysilylpropyl)aminosuccinate (adduct of 3-aminopropyltrimethoxysilane onto diethyl maleate). According to the general teaching of EP 2 952 533 A1, the NCO:OH ratio is preferably set to a value of from 1.5:1 to 2.2:1.

Due to their capacity for moisture-dependent crosslinking, silane-functional polymers are for example used as binders for moisture-curing sealants, adhesives and coating materials. As they are free of isocyanate groups, they can, unlike isocyanate prepolymers for example, be combined with formulation constituents bearing isocyanate-reactive groups in order to produce moisture-curing sealant and adhesive compositions. Examples of these are polyols as plasticizer component and aminosilanes as adhesion promoter.

However, when producing moisture-curing sealants, adhesives and coating materials based on silane-functional polymers, it must be ensured that the composition is largely free of moisture, since otherwise there will already be premature crosslinking of the binder during the storage of the moisture-curing compositions, thereby rendering the moisture-curing composition unusable. In order to prevent such an undesired, spontaneous crosslinking, drying agents are typically added to the moisture-curing composition. This is necessary in particular because, firstly, many of the customarily employed constituents of moisture-curing sealant and adhesive compositions, for example fillers, themselves contain water and hence moisture is inevitably introduced into the moisture-curing composition. Secondly, the moisture-curing composition has to be protected against ingression of moisture from the outside through leaky packaging or diffusion.

Examples of drying agents used include monomeric vinylsilanes, such as vinyltrimethoxysilane or vinyltriethoxysilane. These monomeric silanes react preferentially with the water present in the composition and thus prevent the undesired premature reaction of this water with the silane groups of the binder. However, vinylsilanes are subject to increasingly strict labeling requirements, for which reason there is an interest in replacing these vinylsilanes with other drying agents which do not require labeling and are less hazardous in terms of occupational hygiene.

The use of silane-functional polymers as binders in combination with drying agents is also disclosed, for example, in DE 10 2005 026 085 A1. This publication describes silane-modified urea derivatives and the use thereof as rheological assistants for sealants and adhesives. In one preferred embodiment, the urea derivatives are prepared by reacting a diisocyanate and an aminosilane in the presence of a silane-functional polymer. It is disadvantageous here that the mixtures of binder and urea derivative obtained are highly viscous and usually cannot be processed without the further addition of plasticizers. It is further described that the addition of water scavengers is necessary for increasing the storage stability of the urea derivatives in the binder. Exemplary water scavengers mentioned are vinylsilanes, especially vinyltrimethoxysilane (VTMO). The above applies to a likewise described mixtures of externally prepared urea derivatives with silane-functional binders.

Against this background, the object of the present invention is that of providing novel, less hazardous in occupational hygiene terms, simple to produce drying agents for moisture-curing compositions, especially sealants, adhesives and coating materials, which are suitable for replacing monomeric vinylsilanes such as for example vinyltrimethoxysilane (VTMO).

SUMMARY

This object is achieved by the use of polymer compositions containing silane-functional polymers which can be produced by reacting an isocyanate-reactive (NCO-reactive) polymer having exactly one isocyanate-reactive group per molecule with a diisocyanate and subsequently reacting the remaining isocyanate groups with an NCO-reactive silane, the ratio of the molar amount of the diisocyanate to the molar amount of the NCO-reactive groups of the polymer being at least 1.25. Although such a considerable excess of diisocyanates relative to NCO-reactive groups is typically considered to be disadvantageous for the reasons mentioned above, it has surprisingly been found that the polymer compositions produced in this way can, in addition to their function as binder, also take on the role of a drying agent and hence make the use of conventional additional drying agents such as vinyltriethoxysilane or vinyltrimethoxysilane superfluous. At the same time, the polymer compositions produced in this way exhibit a lower viscosity than comparable polymers produced from the same components but with a lower ratio of diisocyanates to OH groups. In addition, a markedly simplified production compared to the teaching of DE 10 2005 026 085 A1 results.

The invention thus relates to a polymer composition producible by:

DETAILED DESCRIPTION a) reacting an NCO-reactive polymer having a molecular weight $M_n$ of between 2000 and 25 000 g/mol and having exactly one NCO-reactive group per molecule with a diisocyanate, the molar ratio of the diisocyanate molecules to the NCO-reactive groups of the NCO-reactive polymer being at least 2:1;

and subsequently b) reacting the remaining NCO groups in the reaction product from step a) with an NCO-reactive silane.

The polymer composition according to the invention comprises silane-functional polymers which have resulted from the reaction of an NCO-reactive polymer having exactly one NCO-reactive group with a diisocyanate and the subsequent reaction with at least one NCO-reactive silane. In addition, the composition may comprise diurethanes which have resulted from the reaction of two NCO-reactive polymers with a diisocyanate. However, the proportion of these diurethanes is relatively low on account of the high ratio of diisocyanates to NCO-reactive groups used compared to the silane-functional polymers produced according to the prior art, which has the result that the composition as a whole has a relatively low viscosity.

Furthermore, the composition contains so-called free silane-functional reaction products which have resulted from the reaction of the diisocyanate (which has not reacted with the NCO-reactive polymer) with two NCO-reactive silanes.

The molar ratios of these components in the composition according to the invention are determined, with otherwise identical feedstocks, essentially by the molar ratio of the diisocyanate to the NCO-reactive groups of the polymer in step a).

It is assumed that free silane-functional reaction products present in the polymer composition according to the invention react with water preferentially or at least as fast as the terminal silane groups of the silane-functional polymers and hence act as a drying agent. This results in silane-functional polymers present in the polymer composition not crosslinking or only crosslinking to a minor degree in the presence of small amounts of water and the polymer composition itself and moisture-curing compositions which can be produced therefrom are therefore extremely storage-stable. The known hydrolysis/condensation reaction of the silane-functional polymers contained in the polymer composition with water, which in the intended manner should begin only after application of the polymer composition or of a formulation containing same (e.g. adhesive, sealant), would otherwise result in a premature and ultimately unintended increase in the molecular weight and consequently to a rise in the viscosity of the polymer composition, which in turn hinders or even prevents processing of such a formulation.

If the polymer composition is brought into contact with relatively large amounts of water and optionally with a crosslinking catalyst, the silane-functional polymers crosslink as intended and hence the composition cures, as is desired for example when used as a moisture-curing sealant. The polymer composition according to the invention can thus be used as a combination of moisture-curing reactive diluent and drying agent for a moisture-curing composition, especially a sealant or adhesive or a coating composition. In particular, the polymer composition according to the invention can thus be used as a combination of moisture-curing reactive diluent and drying agent for a moisture-curing composition, in particular a sealant or adhesive or a coating composition, when additionally a further moisture-curing binder having at least 2 silane groups per molecule is added.

When reacting the NCO-reactive polymer with the diisocyanate, preferably all NCO-reactive groups of the NCO-reactive polymer are reacted. Likewise, when reacting the reaction product from step a) with the NCO-reactive silane, preferably all free NCO groups of the reaction product from step a) are reacted. Those skilled in the art can ascertain this by determining the isocyanate content, for example by titration according to DIN 11909 or by IR spectroscopy (strong band of the antisymmetric N=C=O stretching vibration between 2300 and 2250 $cm^{-1}$).

The polymer composition according to the invention by preference has a viscosity of less than 150 Pa·s, preferably 2 to 70 Pa·s, particularly preferably 5 to 50 Pa·s, most preferably 5 to 30 Pa~s, measured according to the method of DIN EN ISO 3219/B3.

The molar ratio of diisocyanate to NCO-reactive groups of the NCO-reactive polymer here refers to the ratio of the molar amount of diisocyanate in moles to the total number of NCO-reactive groups of the NCO-reactive polymer in moles. The molar amount of diisocyanate here results from the molecular weight of the diisocyanate and the mass of diisocyanate used. The total number of the NCO-reactive groups of the NCO-reactive polymer in moles results from the mass of NCO-reactive polymer and the number of NCO-reactive groups based on the mass of the NCO-reactive polymer.

The molar ratio of diisocyanate to NCO-reactive groups of the NCO-reactive polymer in step a) is preferably 2:1 to 20:1, particularly preferably 3:1 to 15:1, most preferably 4:1 to 10:1.

Suitable NCO-reactive polymers have exactly one NCO-reactive group. An NCO-reactive group is understood to be a functional group which enters into an addition reaction with an isocyanate group. Suitable examples of NCO-reactive groups are hydroxyl, amino and mercapto groups. Mixtures of NCO-reactive polymers each having different NCO-reactive groups may also be used. NCO-reactive polymers having different NCO-reactive groups may also be used.

The NCO-reactive groups are preferably hydroxyl groups (OH groups).

Various methods can be used to determine the molar amount of NCO-reactive groups. For instance, in the case of NCO-reactive polymer having NCO-reactive amino groups, the amine number (measured according to the method of DIN 53176:2002-11) and the mass of the particular NCO-reactive polymer can be used. For instance, in the case of monools as NCO-reactive polymer, the molar amount of OH groups can be calculated from the mass of the NCO-reactive polymer and the hydroxyl number by known calculation methods. Unless otherwise indicated, the hydroxyl number is determined according to the method of DIN 53240-1 (2012).

Should other methods not be applicable, the NCO-reactive polymer can also be reacted in a significant excess with a diisocyanate having a known NCO content until a constant NCO content is reached, and the amount of unreacted NCO groups determined as described above. The molar amount of remaining NCO-reactive groups in the reaction product from step (a) can then be determined from the difference between the molar amount of the NCO groups used and the unreacted NCO groups.

The NCO-reactive polymer may for example be a polyacrylate, a polycarbonate, a polyester, polyurethane or a polyether which has been functionalized with exactly one NCO-reactive group.

Polyethers are particularly preferred as NCO-reactive polymers as they are for example not attacked or broken down by water or bacteria, in contrast to polyesters, for example.

The NCO-reactive polymers to be used according to the invention preferably have a number-average molecular weight of 2000 to 25 000 g/mol, especially of 4000 to 20 000 g/mol, preferably 5000 to 18 000 g/mol, particularly preferably 6000 to 10 000 g/mol. These molecular weights are particularly advantageous as the corresponding compositions firstly exhibit good compatibilities with co-binders and secondly result in relatively low-viscosity polymer compositions according to the invention.

The NCO-reactive polymer is preferably a monool. Suitable monools for the production of the composition are in particular polyether monools, polyester monools and polycarbonate monools, and also mixtures of these monools, with particular preference being given to polyether monools. Particularly suitable are polytetramethylene monools, polyoxyethylene monools and polyoxypropylene monools, in particular polyoxypropylene monools. It is also possible to use mixtures of different monools.

The monools to be used according to the invention preferably have a number-average molecular weight of 2000 to 25 000 g/mol, especially of 4000 to 20 000 g/mol, preferably 5000 to 18 000 g/mol, particularly preferably 6000 to 10 000 g/mol. These molecular weights are particularly advantageous as the corresponding compositions exhibit good compatibilities with co-binders.

Particular preference is given to polyether monools preparable by what is known as double metal cyanide catalysis (DMC catalysis). This is described for example in U.S. Pat. No. 5,158,922 (e.g. Example 30) and EP-A 0 654 302 (p. 5, l. 26 to p. 6,1. 32). Monools according to the invention are obtained, for example, by starting the synthesis on compounds with only one hydroxyl group. If the synthesis is started, for example, on diethylene glycol monobutyl ether in the presence of propylene oxide, polyoxypropylene monools are obtained. A further process for preparing monools to be used according to the invention is described in EP 0 950 679, by way of example exemplary embodiment 15.

The monools to be used according to the invention preferably have a mean OH functionality of 0.9 to 1.0, particularly preferably of 0.95 to 1.0. The OH functionality of a compound is understood as meaning the mean OH functionality. It indicates the mean number of hydroxyl groups per molecule. The mean OH functionality of a compound can be calculated on the basis of the number-average molecular weight and the hydroxyl number. Unless otherwise indicated, the hydroxyl number of a compound is determined according to the DIN 53240-1 (2012) standard.

Particularly suitable are polyoxyalkylene monools having a degree of unsaturation of less than 0.02 mEq/g (determined according to the method in ASTM D4671-16) and having a number-average molecular weight (determined by GPC) in the range from 2000 to 25 000 g/mol, and also polyoxyethylene monools, polyoxypropylene monools having an average molecular weight of 2000 to 25 000 g/mol. Likewise particularly suitable are what are known as ethylene oxide-terminated ("EO-endcapped", ethylene oxide endcapped) polyoxypropylene monools. The latter are obtained when, during the preparation, propylene oxide is first used as monomer for the polymerization and then, prior to termination of the polymerization, ethylene oxide is used as monomer instead of propylene oxide.

Further suitable monools are poly(meth)acrylate monools.

Diisocyanates used for the production of the polymer composition can be commercially available diisocyanates, especially diisocyanates.

The term "diisocyanate" as used here is a collective term for compounds containing two isocyanate groups (this is understood by those skilled in the art to mean free isocyanate groups of the general structure —N=C=O) in the molecule. These have the general structure O=C=N—R—N=C=O where R typically represents aliphatic, alicyclic and/or aromatic radicals.

Preferably, monomeric diisocyanates having a molecular weight in the range from 140 to 400 g/mol and having aliphatically, cycloaliphatically, araliphatically and/or aromatically bonded isocyanate groups are used.

In a preferred embodiment, the diisocyanate is selected from monomeric diisocyanates. Suitable monomeric diisocyanates are in particular 1,4-diisocyanatobutane (BDI), 1,5-diisocyanatopentane (PDI), hexamethylene 1,6-diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1-isocyanato-3,3,5-trimethyl-5-isocyanatomethylcyclohexane (isophorone diisocyanate; IPDI), 1,3-diisocyanato-2-methylcyclohexane, 1,3-diisocyanato-4-methylcyclohexane, 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI), bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and mixtures thereof.

Further diisocyanates that are likewise suitable can additionally be found, for example, in *Justus Liebigs Annalen der Chemie, volume* 562 (1949) p. 75-136.

In a preferred embodiment the diisocyanate is selected from 1-isocyanato-3,3,5-trimethyl-5-isocyanatomethylcyclohexane (IPDI), hexamethylene 1,6-diisocyanate (HDI), tolylene 2,4- and/or 2,6-diisocyanate (TDI) or mixtures thereof.

In a particularly preferred embodiment, 1-isocyanato-3,3,5-trimethyl-5-isocyanatomethylcyclohexane (IPDI) and/or 1,5-diisocyanatopentane (PDI) and/or hexamethylene 1,6-diisocyanate (HDI) is used.

If a particularly low viscosity of the composition is desired, preference is given to using HDI or a mixture of HDI with other diisocyanates. The ratio of diisocyanates to NCO-reactive groups is particularly preferably at least 5:1 here.

At smaller ratios of diisocyanates to NCO-reactive groups, preference is given to using a diisocyanate having isocyanate groups of different reactivities, such as 1-isocyanato-3,3,5-trimethyl-5-isocyanatomethylcyclohexane (IPDI), tolylene 2,4- and/or 2,6-diisocyanate (TDI), to achieve a low viscosity, as the content of diurethanes is suppressed as a result.

Suitable NCO-reactive silanes have at least one NCO-reactive group, such as for example a hydroxyl, amino and mercapto group. It is also possible to use mixtures of different NCO-reactive silanes. The NCO-reactive silane used is a compound denoting at least one silicon atom, at least one organic radical bonded to the silicon atom via an Si—O bond, and at least one organic radical bonded to the silicon atom via an Si—C bond and having at least one NCO-reactive group. For example, the NCO-reactive silane is an aminosilane, mercaptosilane or hydroxysilane.

The NCO-reactive silane is preferably an aminosilane. The aminosilane used for producing the composition is a compound denoting at least one silicon atom, at least one organic radical bonded to the silicon atom via an Si—O bond, and at least one organic radical bonded to the silicon atom via an Si—C bond and having at least one primary or secondary amino group. The organic radical bonded to the silicon atom via an Si—O bond is preferably an alkoxy or acyloxy group. The amino group is preferably a secondary amino group. Such aminosilanes having a secondary amino group are also referred to as secondary aminosilanes.

It is also possible to use mixtures of primary and secondary aminosilanes. Examples of suitable aminosilanes are primary aminosilanes such as 3-aminopropyltrimethoxysilane, 3-aminopropyldimethoxymethylsilane; secondary aminosilanes such as N-butyl-3-aminopropyltrimethoxysilane, N-phenyl-3-aminopropyltrimethoxysilane; the products of the Michael addition of primary aminosilanes such as 3-aminopropyltrimethoxysilane or 3-aminopropyldimethoxymethylsilane onto Michael acceptors such as acrylonitrile, (meth)acrylic esters, (meth)acrylamides, maleic and fumaric diesters, citraconic diesters and itaconic diesters, for example dimethyl and diethyl N-(3-trimethoxysilylpropyl)aminosuccinates; and analogs of the aminosilanes mentioned with ethoxy or isopropoxy groups instead of methoxy groups on the silicon, preferably with ethoxy groups.

Particularly effective drying agents are obtained when the aminosilanes used are those compounds in which the amino group is joined to a silicon atom via a methylene group. Mention is made by way of example of N-cyclohexylaminomethyltriethoxysilane, which is available as GENIOSIL® XL 926 (Wacker).

In one embodiment, the NCO-reactive silane is a compound of formula (I):

$$R^1{}_3Si(CH_2)_nX \qquad (I),$$

where $R^1$ each radical is in each case independently selected from $C_1$-$C_8$-alkyl, $C_6$-$C_{20}$-aryl, $C_1$-$C_8$-alkoxy or $C_1$-$C_8$-acyloxy and at least one of the radicals $R^1$ is a $C_1$-$C_8$-alkoxy or $C_1$-$C_8$-acyloxy radical, n is an integer between 1 and 4, X is selected from —OH, —SH or —NHR$^{2-}$;

$R^2$ is selected from H, $C_1$-$C_{20}$-alkyl, —CH$_2$CH$_2$CN or —CHR$^3$CH$_2$COOR$^4$, $R^3$ is selected from H and —COOR$^4$, and $R^4$ in each case is $C_1$-$C_{20}$-alkyl.

$C_1$-$C_8$-alkoxy radical here denotes a radical of the general formula R—O—, with one R being an alkyl radical having 1 to 8 carbon atoms. $C_1$-$C_8$-acyloxy radical here denotes a radical of the general formula R—CO—O—, with R being hydrogen or an alkyl radical having 1 to 7 carbon atoms.

Preferably, two or three radicals $R^1$ are in each case $C_1$-$C_8$-alkoxy groups and any radical $R^1$ possibly remaining is a $C_1$-$C_8$-alkyl group.

Particularly preferably, each radical $R^1$ is in each case independently selected from methyl, ethyl, methoxy and ethoxy.

The number n is preferably 1 or 3.

X is preferably —NHR$^2$.

$R^2$ is preferably selected from $C_1$-$C_6$-alkyl, —CH$_2$CH$_2$CN or —CHR$^3$CH$_2$COOR$^4$, with $R^3$ being selected from H and —COOR$^4$, and $R^4$ in each case being $C_1$-$C_6$-alkyl.

Particularly preferably, $R^2$ is selected from $C_1$-$C_6$-alkyl, or —CHR$^3$CH$_2$COOR$^4$, with $R^3$ denoting —COOR$^4$, and $R^4$ in each case being $C_1$-$C_6$-alkyl.

In a particularly preferred embodiment, $R^2$ denotes —CHR$^3$CH$_2$COOR$^4$, with $R^3$ being a group —COOR$^4$, and $R^4$ in each case being $C_1$-$C_6$-alkyl.

The present invention also relates to a moisture-curing composition containing the polymer composition described above. The moisture-curing composition according to the invention is preferably an adhesive, sealant or coating material. It is particularly preferably a sealant or adhesive.

The moisture-curing composition according to the invention generally contains, in addition to the polymer composition described above, at least one additive selected from one or more fillers, one or more crosslinking catalysts, one or more adhesion promoters and/or one or more plasticizers and/or a further binder based on silane-functional polymers having on average more than one silane group per molecule.

In one embodiment, the moisture-curing composition contains the polymer composition described above and at least one crosslinking catalyst. In one embodiment, the moisture-curing composition contains the polymer composition described above and at least one filler. In a further embodiment, the moisture-curing composition contains the polymer composition described above and at least one further silane-functional polymer having on average more than one silane group per molecule.

In a further embodiment, the moisture-curing composition contains the polymer composition described above, at least one crosslinking catalyst and at least one filler. In a further embodiment, the moisture-curing composition contains the polymer composition described above, at least one crosslinking catalyst and at least one filler and also at least one further silane-functional polymer having on average more than one silane group per molecule.

The moisture-curing composition is preferably produced and stored with exclusion of moisture. Typically, the moisture-curing composition is storage-stable, that is to say it can be stored with exclusion of moisture in a suitable packaging or arrangement, such as for example a drum, a pouch or a cartridge, over a period of several months to a year and longer, without any change in its use properties or in its properties after curing to an extent relevant for the use thereof. Typically, the storage stability is ascertained by measuring the viscosity or the expression force.

When the moisture-curing composition is applied as intended, the silane groups present in the polymer composition according to the invention come into contact with moisture. The silane groups have the property of hydrolyzing on contact with moisture. In the process, organosilanols and, via subsequent condensation reactions, organosiloxanes are formed. As a result of these reactions, which may be accelerated through the use of a crosslinking catalyst, the moisture-curing composition ultimately cures. This process is also referred to as crosslinking. The water required for the curing can either come from the air (atmospheric humidity) or from moisture present in the coated substrates or else the moisture-curing composition can be brought into contact with a water-containing component, for example by spread-coating, for example using a smoothing means, or by spraying, or a water-containing component can be added to the moisture-curing composition during application, for example in the form of a water-containing paste.

The moisture-curing composition according to the invention preferably has a particularly low water content after production. The water content of the moisture-curing composition is by preference up to 0.1% by weight, preferably up to 0.05% by weight, particularly preferably up to 0.01% by weight, based on the total weight of the composition. The water content is determined here according to DIN EN ISO 15512:2017-03, method B2.

In order to achieve the low water content mentioned, it is generally not necessary to add further drying agents. In particular, this relates to reactive drying agents, that is to say compounds which react with the water present in the moisture-curing composition.

Preferably, the addition of further drying agents, especially reactive drying agents, is completely dispensed with. Reactive drying agents are those the drying action of which is attributable to a reaction with water. Preferably, the addition of in particular reactive drying agents which do not satisfy the OECD definition of a polymer as of Jan. 1, 2017, especially alkylsilanes and vinyl group-containing silanes, such as for example vinyltrimethoxysilane or vinyltriethoxysilane, is dispensed with. In this context, "vinyl group-containing silanes" refers to compounds comprising at least one Si—CH=CH$_2$ group. This term in particular covers vinyltrialkoxysilanes and the reaction products formed during the reaction of these silanes with water, or partial hydrolyzates of these compounds. A reactive desiccant is generally understood here to mean a desiccant which enters into a chemical reaction with water. In contrast, physical desiccants bind water so that it is not available for a chemical reaction. Examples of a physical desiccant are particular fillers such as zeolites or molecular sieves.

In one embodiment, the moisture-curing composition comprises, after production and prior to application, only up to 1% by weight, preferably up to 0.8% by weight, particularly preferably up to 0.5% by weight, of vinyl group-containing silanes and/or alkylsilanes, based on the total weight of the moisture-curing composition. In particular, the moisture-curing composition by preference comprises in each case only up to 1% by weight, preferably up to 0.8% by weight, particularly preferably up to 0.5% by weight, of vinyltrimethoxysilane and vinyltriethoxysilane.

In other words: The amount of the vinyl group-containing silanes and/or alkylsilanes used for the production of the moisture-curing composition can be limited to the proportions by weight indicated hereinabove or the use of vinyl group-containing silanes can preferably even be dispensed with completely.

In one preferred embodiment, the moisture-curing composition does not contain any vinyl group-containing silanes and/or alkylsilanes or any reaction products formed in the reaction of these silanes with water. "Does not contain any" means here that the individual concentrations of the vinyl group-containing silanes and/or alkylsilanes in each case do not exceed <0.1% by weight, based on the moisture-curing composition.

The moisture-curing composition preferably has a viscosity at 23° C. of less than 100 Pa·s, measured according to the method of DIN EN ISO 3219/B3 at a shear rate of 40/s. The viscosity of the moisture-curing composition is substantially determined by the mixing ratio of silane-functional polymer and filler and also by the nature of the filler, and can optionally be modified by addition of a plasticizer. As a result of the above described properties of the polymer composition according to the invention, there is no significant change in the viscosity even upon relatively long storage of the composition, resulting in a high storage stability of the composition.

The moisture-curing composition preferably comprises at least one filler, which serves in particular to influence the rheological properties and mechanical properties of the composition both in the uncured and in the cured state.

Examples of suitable fillers are chalk, powdered lime, precipitated and/or fumed silica, zeolites, bentonites, magnesium carbonate, kieselguhr, alumina, clay, talc, titanium oxide, iron oxide, zinc oxide, sand, quartz, flint, mica, glass powder and other ground mineral materials. In addition, organic fillers can also be used, in particular carbon black, graphite, wood fibers, wood flour, wood shavings, cellulose, cotton, dried pulp, wood chips, chopped straw, chaff, ground walnut shells and other short-cut fibers. Short fibers such as glass fiber, glass filament, polyacrylonitrile, carbon fiber, Kevlar fiber or polyethylene fibers can also be added. Aluminum powder is likewise suitable as a filler. In addition, hollow spheres with a mineral shell or a plastics shell are suitable as fillers. These may for example be hollow glass spheres, which are commercially available under the trade names Glass Bubbles®. Plastics-based hollow spheres are commercially available for example under the names Expancel® or Dualite®. These are composed of inorganic or organic materials, each with a diameter of 1 mm or less, preferably of 500 μm or less.

For example, the filler used is a finely divided silica having a BET surface area of 10 to 500 m²/g. When used, such a silica does not bring about any substantial increase in the viscosity of the composition according to the invention, but it does contribute to a strengthening of the cured preparation. This strengthening for example improves the initial strengths, tensile shear strengths and the adhesion of the adhesives, sealants or coating materials in which the composition according to the invention is used. Preference is given to using uncoated silicas having a BET surface area of less than 100, more preferably of less than 65 m²/g, and/or coated silicas having a BET surface area of 100 to 400, more preferably of 100 to 300, especially of 150 to 300 and very particularly preferably of 200 to 300 m²/g.

Zeolites used are preferably alkali metal aluminosilicates, for example sodium potassium aluminosilicates of the general empirical formula aK$_2$O*bNa$_2$O*Al$_2$O$_3$*2SiO*nH$_2$O with 0<a, b<1 and a+b=1. The pore opening of the zeolite used or of the zeolites used is preferably just large enough to accommodate water molecules. Accordingly, an effective pore opening of the zeolites of less than 0.4 nm is preferred. The effective pore opening is particularly preferably 0.3 nm±0.02 nm. The zeolite(s) is/are preferably used in the form of a powder.

In one embodiment, the filler comprises naturally occurring silicates (for example clay, loam, talc, mica, kaolin), carbonates (for example chalk, dolomite), sulfates (for example baryte), quartz sand, silica (especially precipitated or fumed silica), metal hydroxides (for example aluminum hydroxide, magnesium hydroxide), metal oxides (for example zinc oxide, calcium oxide, aluminum oxide) and/or carbon black.

Chalk is preferably used as filler. The chalk used here may be cubic, non-cubic, amorphous and other polymorphs of magnesium and/or calcium carbonate. The chalks used are preferably surface-treated or coated. Coating compositions used for this purpose are preferably fatty acids, fatty acid soaps and fatty acid esters, for example lauric acid, palmitic acid or stearic acid, sodium or potassium salts of such acids or the alkyl esters thereof. In addition, however, other surface-active substances such as sulfate esters of long-chain alcohols or alkylbenzenesulfonic acids or the sodium or potassium salts thereof or else coupling reagents based on silanes or titanates are also suitable. The surface treatment of the chalks is frequently associated with an improvement in the processability, and also in the bonding force and also the weather resistance of the compositions. The coating composition is for this purpose typically used in a proportion of 0.1% to 20% by weight, preferably 1% to 5% by weight, based on the total weight of the untreated chalk Depending on the profile of properties sought, precipitated or ground chalks or mixtures thereof may be used. Ground chalks may for example be produced from natural lime, limestone or marble by mechanical grinding, with dry or wet methods possibly being used. Depending on the grinding method, fractions of different average particle size are obtained. Advantageous specific surface area values (BET) are between 1.5 m²/g and 50 m²/g.

The fillers used to produce the composition typically include a certain proportion of water. This is disadvantageous in the case of the silane-functional polymers known from the prior art since the water present in the filler leads to a pre-crosslinking of the silane-functional polymers even during storage of the composition. For this reason, in the prior art either additional drying agents are added to the composition or only anhydrous fillers are used. Since the silane-functional polymer according to the invention acts simultaneously as a drying agent, it is possible for the production of the composition according to the invention also to use a filler which contains a certain proportion of water, without this having negative consequences for the storage stability of the composition.

In one embodiment, the filler used for the production of the composition can accordingly contain small amounts of water. Preferably, the filler contains water in an amount of up to 1% by weight, preferably 0.01% to 0.5% by weight, particularly preferably 0.1% to 0.3% by weight, based on the mass of the filler, measured according to the method in/of DIN EN ISO 15512: 2017-03, method B2.

The proportion of filler in the moisture-curing composition is by preference 10% to 80% by weight, preferably 20% to 70% by weight, particularly preferably 40% to 70% by weight, based on the total weight of the moisture-curing composition.

The moisture-curing composition preferably comprises at least one adhesion promoter. An adhesion promoter is understood to be a substance which improves the adhesion properties of adhesive layers on surfaces. Customary adhesion promoters (tackifiers) known to those skilled in the art may be used alone or as a combination of a plurality of compounds. For example, resins, terpene oligomers, coumarone/indene resins, aliphatic, petrochemical resins and modified phenol resins are suitable. Suitable within the context of the present invention, for example, are hydrocarbon resins, as are obtained by polymerization of terpenes, primarily α- or β-pinene, dipentene or limonene. These monomers are generally polymerized cationically with initiation using Friedel-Crafts catalysts. Terpene resins also include copolymers of terpenes and other monomers, for example styrene, α-methylstyrene, isoprene and the like. The resins mentioned are used, for example, as adhesion promoters for pressure-sensitive adhesives and coating materials. Likewise suitable are the terpenephenol resins produced by acid-catalyzed addition of phenols onto terpenes or rosin. Terpenephenol resins are soluble in most organic solvents and oils and are miscible with other resins, waxes and rubber. Adhesion promoters in the abovementioned sense which are likewise suitable within the context of the present invention are rosins and derivatives thereof, for example the esters or alcohols thereof.

Silane adhesion promoters, in particular aminosilanes, are particularly well-suited.

In one embodiment, the moisture-curing composition comprises, as adhesion promoter, a compound of general formula (II)

$$R^1{}_3SiR^2N(R^3)_2 \qquad (II),$$

where $R^1$ each radical is in each case independently selected from $C_1$-$C_8$-alkyl, $C_1$-$C_8$-alkoxy or $C_1$-$C_8$-acyloxy and at least one radical $R^1$ is a $C_1$-$C_8$-alkoxy radical or $C_1$-$C_8$-acyloxy radical, $R^2$ is a divalent hydrocarbon radical having 1 to 12 carbon atoms and optionally containing one or more heteroatoms, and $R^3$ each radical is in each case independently selected from H and $C_1$-$C_8$-alkyl.

Such compounds naturally have a high affinity for the binding polymer components of the moisture-curing composition, but also for a wide range of polar and non-polar surfaces and therefore contribute to the formation of particularly stable adhesion between the sealant or adhesive and the substrates to be respectively joined.

The group $R^2$ can for example be a straight-chain, branched or cyclic, substituted or unsubstituted alkylene radical. It may contain nitrogen (N) or oxygen (O) as heteroatom. The group $R^2$ can in particular comprise an acetoxy group —O—CO—R, with R being a divalent hydrocarbon radical.

In one particular embodiment, the adhesion promoter used is an oligomer of an aminosilane; oligomers of aminosilanes in which the silicon atoms are joined via siloxane bridges are particularly suitable. Oligomeric diaminosilanes are especially suitable, such as for example Dynasilan® 1146 from Evonik. Partial hydrolyzates of aminosilanes or other silanes are also suitable. Preference is given to using oligomeric silanes.

The proportion of adhesion promoter in the moisture-curing composition is by preference 0.1% to 5% by weight, preferably 0.2% to 3% by weight, particularly preferably 0.5% to 1.5% by weight, based on the total weight of the moisture-curing composition.

If the adhesion promoters used are compounds having reactive silane groups, the latter can additionally influence the storage stability of the moisture-curing compound, but are not absolutely necessary for achieving storage stability.

In one particular embodiment, the moisture-curing compositions contain in each case less than 0.1% by weight of silane adhesion promoters and desiccants not satisfying the OECD definition of a polymer as of Jan. 1, 2017.

In one embodiment, the moisture-curing composition also comprises at least one catalyst for the crosslinking of silane-functional polymers (crosslinking catalyst). This catalyst facilitates the reaction of the silane-functional polymer with water and the following condensation reaction for the formation of crosslinked polysiloxanes. Crosslinking catalysts used can be the catalysts known in the prior art. Examples of these are Lewis and/or Bronstedt acids and bases. The catalyst may for example be a metal catalyst or a nitrogen-containing compound.

Suitable metal catalysts are in particular organotin compounds, organotitanates, organozirconates and organoaluminates. The organotitanates, organozirconates and organoaluminates preferably have ligands which are selected from an alkoxy group, sulfonate group, carboxylate group, dialkylphosphate group, dialkylpyrophosphate group and acetylacetonate group, where all ligands may be identical or different from each other.

Suitable nitrogen-containing compounds are for example amidines; amines such as in particular N-ethyldiisopropylamine, N,N,N',N'-tetramethylalkylenediamines, polyoxyalkyleneamines, 1,4-diazabicyclo[2.2.2]octane; aminosilanes such as 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine and analogs thereof having ethoxy or isopropoxy groups instead of methoxy groups on the silicon.

Particularly preferred crosslinking catalysts are organotitanates and amidines.

Preferred organotitanates are in particular bis(ethylacetoacetato)diisobutoxytitanium(IV), bis(ethylacetoacetato) diisopropoxytitanium(IV), bis(acetylacetonato)diisopropoxytitanium(IV), bis(acetylacetonato) diisobutoxytitanium(IV), tris(oxyethyl) amineisopropoxytitanium(IV), bis[tris(oxyethyl)amine] diisopropoxytitanium(IV), bis(2-ethylhexane-1,3-dioxy) titanium(IV), bis(neopentyl(diallyl)oxydiethoxytitanium (IV), tris[2-((2-aminoethyl)amino)ethoxy]ethoxytitanium (IV), titanium(IV) tetrabutoxide, tetra(2-ethylhexyloxy) titanate, tetra(isopropoxy) titanate and polybutyl titanate.

Preferred amidines are in particular 1,8-diazabicyclo [5.4.0]undec-7-ene (DBU), 1,5-diazabicyclo[4.3.0]non-5-ene (DBN), 6-dibutylamino-1,8-diazabicyclo[5.4.0]undec-7-ene; methyl-triazabicyclodecene, guanidines such as tetramethylguanidine, 2-guanidinobenzimidazole, acetylacetoneguanidine, 1,3-di-o-tolylguanidine, 1,3-diphenylguanidine, tolylbiguanidine, 2-tert-butyl-1,1,3,3-tetramethylguanidine; and imidazoles such as N-(3-trimethoxysilylpropyl)-4,5-dihydroimidazole and N-(3-triethoxysilylpropyl)-4,5-dihydroimidazole.

Mixtures of catalysts can be used, especially mixtures of metal catalysts and non-metal catalysts containing a nitrogen atom, the metal catalysts preferably not containing any tin and the non-metal catalysts being amidines.

In one embodiment, therefore, the moisture-curing composition contains less than 0.1% tin (calculated based on the proportion by weight of tin atoms). In particular, the tin content of the composition is less than 0.06% by weight, in particular less than 0.01% by weight. In this case, the catalyst used for the production of the polymer composition according to the invention is preferably also accordingly selected or omitted so that this is ensured.

The proportion of crosslinking catalyst in the moisture-curing composition is by preference 0.001% to 5% by weight, preferably 0.005% to 1% by weight, particularly preferably 0.01% to 0.5% by weight, based on the total weight of the composition.

In one embodiment, the moisture-curing composition also comprises at least one plasticizer.

Examples of suitable plasticizers are esters of organic carboxylic acids or their anhydrides, such as fatty acid alkyl esters, phthalates, e.g. dioctyl phthalate, diisononyl phthalate or diisodecyl phthalate, adipates, e.g. dioctyl adipate, azelates and sebacates, polyols, e.g. polyoxyalkylene polyols or polyester polyols, organic phosphoric and sulfonic esters, mineral oils or polybutenes. The use of phthalate-containing plasticizers is preferably dispensed with here.

Plasticizers used are preferably fatty acid alkyl esters, alkylsulfonic esters of phenol, mineral oils, plasticizers based on renewable raw materials, which may likewise be fatty acid alkyl esters, or combinations of these.

Examples of plasticizers based on renewable raw materials are vegetable oils, such as rapeseed oil, soybean oil and palm oil, and esters, especially methyl esters, of vegetable oils, such as rapeseed oil methyl ester, soya methyl ester and palm oil methyl ester.

Examples of plasticizers not based on renewable raw materials but which are phthalate-free are diisononyl cyclohexane-1,2-dicarboxylate, alkylsulfonic esters of phenol and polyethers having a mean molar mass of less than 4000 g/mol, such as for example Desmophen 2061 BD from Covestro Deutschland AG.

The plasticizer particularly preferably comprises diisononyl cyclohexane-1,2-dicarboxylate (DINCH), alkylsulfonic esters of phenol, rapeseed oil methyl ester or a combination thereof, preference being given to using a combination of diisononyl cyclohexane-1,2-dicarboxylate and rapeseed oil methyl ester.

The proportion of plasticizer in the moisture-curing composition is by preference 1% to 50% by weight, preferably 5% to 30% by weight, particularly preferably 5% to 25% by weight, based on the total weight of the moisture-curing composition. The moisture-curing composition can additionally also contain further constituents. Examples of such constituents are solvents; fibers, for example of polyethylene; dyes; pigments; rheology modifiers such as thickeners or thixotropic agents, for example urea compounds of the type described as thixotropic agents ("thixotropy endowing agent") in WO 2002/048228 A2 on pages 9 to 11, polyamide waxes, hydrogenated castor oil, or swellable plastics such as PVC, stabilizers, for example against heat, light and UV radiation; flame-retardant substances; surface-active substances such as wetting agents, leveling agents, deaerating agents or defoamers; biocides such as algicides, fungicides or substances which inhibit fungal growth; and further substances typically used in moisture-curing compositions. In addition, what are known as reactive diluents, which are incorporated into the polymer matrix during curing of the composition, in particular by reaction with the silane groups, may optionally be used.

Besides the polymer composition according to the invention, further silane-functional polymers may also be present as a constituent of the moisture-curing composition according to the invention.

Particularly preferably, those silane-functional polymers which have silane groups with relatively low reactivity with respect to water may be added. Examples of these are those polymers which have resulted from the reaction of polyols with isocyanatosilanes and/or those which are obtainable via a hydrosilylation reaction of polymers having terminal double bonds, for example poly(meth)acrylate polymers or polyether polymers, especially of allyl-terminated polyoxyalkylene polymers, known for example from U.S. Pat. Nos. 3,971,751, 6,207,766, the entire disclosures of which are incorporated herein.

Examples of further suitable silane-functional polymers which can be mentioned are commercially available silane-modified polymers, in particular products with the trade names MS Polymer™ (from Kaneka Corp.; especially the types S203H, S303H, S227, S810, MA903 or S943); MS Polymer™ or Silyl™ (from Kaneka Corp.; especially the types SAT010, SAT030, SAT200, SAX350, SAX400, SAX725, MAX450, MAX602 or MAX951); Excestar® (Asahi Glass Co. Ltd.; especially the types S2410, S2420, S3430 or S3630); SPUR+*(from Momentive Performance Materials; especially the types 1015LM or 1050MM); Vorasil™ (from Dow Chemical Co.; especially the types 602 or 604); Desmoseal® S (from Covestro Deutschland AG; especially the types S XP 2458, S XP 2636, S XP 2749, S XP 2774 or S XP 2821); TEGOPAC® (from Evonik Industries AG; especially the types Seal 100, Bond 150 or Bond 250); or Geniosil® STP (from Wacker Chemie AG; especially the types E15, E35, E10, E30).

In one embodiment, the moisture-curing composition comprises
  5% to 25% by weight of the polymer composition according to the invention;
  5% to 50% by weight of a further silane-functional polymer;
  10% to 70% by weight of at least one filler;
  up to 5% by weight of at least one adhesion promoter;
  0.001% to 5% by weight of at least one crosslinking catalyst; and
  up to 50% by weight of at least one plasticizer,
  based in each case on the total weight of the moisture-curing composition.

The invention also relates to a process for producing the polymer composition according to the invention, comprising the steps of:
  b) reacting an NCO-reactive polymer having a molecular weight $M_n$ of between 2000 and 25 000 g/mol and having exactly one NCO-reactive group per molecule with a diisocyanate, the molar ratio of the diisocyanate molecules to the NCO-reactive groups of the NCO-reactive polymer being at least 2:1;
  and subsequently
  b) reacting the remaining NCO groups in the reaction product from step a) with an NCO-reactive silane.

When reacting the NCO-reactive polymer with the diisocyanate, preferably all NCO-reactive groups of the polymer are reacted. Likewise, when reacting the reaction product from step a) with the NCO-reactive silane, preferably all as-yet unreacted NCO groups in step a) are reacted.

The molar ratio of diisocyanate to NCO-reactive groups of the polymer in step a) of the production process is preferably 1.25 to 10, particularly preferably 1.5 to 7, most preferably 2 to 5.

The diisocyanate is reacted with the NCO-reactive polymer in this case for example at a temperature of 20 to 100° C., optionally with addition of a suitable catalyst, in particular a urethanization catalyst such as for example dibutyltin dilaurate. The reaction product thus formed is reacted with the NCO-reactive silane for example at a temperature of 30 to 100° C.

Due to the high ratio of NCO groups to NCO-reactive groups, in many cases a rapid reaction can be conducted even without addition of a tin-containing catalyst, in particular when aromatic NCO groups, such as for example those of toluene diisocyanates, are reacted. Therefore, in a preferred embodiment, no tin-containing catalyst is used, tin-free catalysts such as the bismuth, zirconium and/or titanium compounds known from the prior art being used instead. In a further embodiment, the reaction is conducted wholly without a catalyst.

In one embodiment, at least one step a) and/or b) is performed in the presence of a plasticizer or solvent. Preferably, however, the addition of plasticizer and/or solvent is dispensed with.

The invention also relates to a process for producing the moisture-curing composition according to the invention, wherein a polymer composition according to the invention is mixed with at least one filler, at least one adhesion promoter, at least one crosslinking catalyst and/or at least one plasticizer.

In one embodiment of the process, the polymer composition according to the invention is mixed with at least one filler having a water content of up to 1% by weight, preferably 0.01% to 0.5% by weight, particularly preferably 0.1% to 0.3% by weight, based on the total weight of the filler.

In a preferred embodiment of the process, no vinyl group-containing silane is added to the moisture-curing composition. In a further embodiment of the process, at most 1% by weight, preferably up to 0.8% by weight, particularly preferably up to 0.5% by weight of vinyl group-containing silanes are added to the moisture-curing composition, based on the total weight of the moisture-curing composition. In particular, the composition contains less than 1.0% by weight of vinyltrimethoxysilane and vinyltriethoxysilane.

In a further embodiment, a plurality of alkyl- and/or vinylsilanes are added, with the proportion of each individual one based on the total weight of the moisture-curing composition not exceeding 0.1% by weight.

The invention lastly also relates to the use of the polymer composition according to the invention as a drying agent for moisture-curing adhesives, sealants and coating materials. In particular, it also relates to the use of the polymer composition according to the invention as a combination of drying agent and binder for moisture-curing adhesives, sealants and coating materials.

The polymer compositions according to the invention are suitable in particular as a drying agent for moisture-curing adhesives for fixing floor coverings; they are very particularly applicable for use in parquet adhesives.

EXAMPLES

For the production of the polymer compositions according to the invention, the following diethylene glycol monobutyl ether-started polyoxypropylene polymers having in each case one hydroxyl group per molecule, produced analogously to the method in EP 0 654 302 A1 were used.

Monool I

| | |
|---|---|
| OH number: | 55.1 mg KOH/g (determined according to DIN 53240-1 (2012), corresponding to a molar mass of 1018 g/mol) |
| Viscosity at 25° C.: | 80 mPas |
| Water content: | 100 ppm |

Monool II

| | |
|---|---|
| OH number: | 12.7 mg KOH/g (determined according to DIN 53240-1 (2012), corresponding to a molar mass of 4417 g/mol) |
| Viscosity at 25° C.: | 814 mPas |
| Water content: | 100 ppm |

Monool III

| | |
|---|---|
| OH number: | 2.9 mg KOH/g (determined according to DIN 53240-1 (2012), corresponding to a molar mass of 19 345 g/mol) |
| Viscosity at 25° C.: | 36 100 mPas |
| Water content: | 200 ppm |

Preparation of Aspartic Ester AE1

A diethyl N-(3-trimethoxysilylpropyl)aspartate was prepared according to EP-A 0 596 360, example 5.

Production of a Silane-Functional Polymer SP

In a 2l sulfonation flask with lid, stirrer, thermometer and nitrogen flow, 880.1 g of a propylene glycol having an OH number of 13.4 mg KOH/g (determined according to DIN 53240-1 (2012)) (Acclaim® Polyol 8200 N from Covestro Deutschland AG; Leverkusen D E) were reacted with 46.7 g of isophorone diisocyanate (IPDI, Desmodur® I, Covestro Deutschland AG, NCO content 37.8%, molar mass 222 g/mol) after addition of 0.04 g of dibutyltin dilaurate at 60° C. until the theoretical isocyanate content was reached. After addition of the amounts of diethyl N-(3-trimethoxysilylpropyl)aspartate (prepared according to EP-A 0 596 360, example 5) indicated in table 1 under "Amount of NCO-reactive silane", the mixture was stirred further until it was no longer possible to observe any isocyanate band in the IR spectrum.

Production of the Polymer Compositions P1-P3 According to the Invention

In a 2l sulfonation flask with lid, stirrer, thermometer and nitrogen flow, the amounts of the polyoxypropylene polymers indicated in table 1 under "Monool I-III" were reacted with the amount of hexamethylene diisocyanate (HDI, Desmodur® H, Covestro Deutschland AG, NCO content 50%, molar mass 168 g/mol) indicated in table 1 under "Hexamethylene diisocyanate" at 60° C. with addition of the amount of dibutyltin dilaurate indicated in table 1 under "Dibutyltin dilaurate" until complete reaction of the NCO-reactive groups of the NCO-reactive polymer (here hydroxyl groups of the polyoxypropylene polymer). After addition of the amounts of diethyl N-(3-trimethoxysilylpropyl)aspartate indicated in table 1 under "Aspartic ester AE1", the mixture was stirred further until it was no longer possible to observe any isocyanate band in the IR spectrum. The viscosity of the polymer compositions obtained was determined 24 h after production of the polymer compositions according to the method in DIN EN ISO 3219/B3 using a Physica MCR 51 rheometer from Anton Paar Germany GmbH (D).

TABLE 1

| Polymer composition | P1 | P2 | P3 |
|---|---|---|---|
| Monool I | 509.0 g | | |
| Monool II | | 421.4 g | |
| Monool III | | | 831.9 g |
| Hexamethylene diisocyanate | 168.0 g | 112.2 g | 36.1 g |
| Aspartic ester AE1 | 527.2 g | 466.1 g | 136.0 g |
| Dibutyltin dilaurate | 0.06 g | 0.05 g | 0.05 g |
| Eq NCO groups | 2 | 1.33 | 0.43 |
| Eq OH groups | 0.5 | 0.095 | 0.043 |
| Index | 4 | 14 | 10 |
| Eq Silane | 1.5 | 1.23 | 0.387 |
| Viscosity [Pas], 24 h after production | 1.6 | 3.0 | 56 |

Example MC-2

Production of Moisture-Curing Compositions Without Addition of Vinylsilanes

The polymer compositions P1-P3 are admixed with the amount of water indicated in the table, the mixture is homogenized for 10 minutes in a Speedmixer and the viscosity is determined at 23° C. after storage for 24 h in a closed vessel.

TABLE 2

| Amount of P1 [g] | Amount of water [g] | Molar ratio Water/—SiOR$_3$ | Viscosity after 24 h at 23° C. |
|---|---|---|---|
| 50 | 1.68 | 1:1.3 | 1.3 |
| 50 | 1.26 | 1:1 | 1.2 |
| 50 | 0.84 | 1:0.66 | 1.2 |
| 50 | 0.42 | 1:0.33 | 1.2 |

| Amount of P2 [g] | Amount of water [g] | Molar ratio Water/—SiOR$_3$ | Viscosity after 24 h at 23° C. |
|---|---|---|---|
| 50 | 1.8 | 1:1.3 | 2.6 |
| 50 | 1.35 | 1:1 | 2.5 |
| 50 | 0.9 | 1:0.66 | 2.5 |
| 50 | 0.45 | 1:0.33 | 2.4 |

| Amount of P3 [g] | Amount of water [g] | Molar ratio Water/—SiOR$_3$ | Viscosity after 24 h at 23° C. |
|---|---|---|---|
| 50 | 0.52 | 1:1.3 | viscous |
| 50 | 0.39 | 1:1 | viscous |
| 50 | 0.26 | 1:0.66 | 64 |
| 50 | 0.13 | 1:0.33 | 45 |

It is apparent (see table 2) that the polymer compositions P1-P3 react with stoichiometric and substoichiometric amounts of water and hence remain liquid to viscous. The viscosity-increasing effect of the increase in the molar mass is in this case at least partly compensated by the viscosity-lowering effect of the release of methanol. The polymer compositions P1-P3 thus clearly functioned as desiccants.

Example MC-1 (According to the Invention, Without VTMO Desiccant)

A moisture-curing compositions based on polymer compositions P2 was produced according to the following procedure: 516.16 g of Omyalite® 95 T (calcium carbonate, from Omya) filler, dried beforehand for 16 hours at 100° C. in an air circulation drying cabinet to a water content of 0.08% by weight, are dispersed with 132.2 g of plasticizer (Mesamoll®, from Lanxess, water content 0.03% by weight), 267.21 g of silane-functional polymer SP and also 56.2 g of polymer composition P2, 8.1 g of Cab-O-Sil® TS 720 (hydrophobic fumed silica, from Cabot, water content 0.11% by weight) and 2.9 g of 1,8-diazabicyclo[5.4.0]undec-7-ene (Sigma-Aldrich Co. LLC) in a laboratory dissolver with a butterfly stirrer (200 revolutions/min) and a dissolver disk (2500 revolutions/min) for 15 min under a static vacuum and with cooling. Static vacuum is to be understood here as meaning that the apparatus is evacuated down to a pressure of 200 mbar (dynamic vacuum) and the connection to the vacuum pump is then severed. Cooling was chosen such that during the entirety of production a temperature of 65° C. is not exceeded. Then, 1.0 g of aminopropyltrimethoxysilane (Dynasilan® AMMO, Evonik) are added and the mixture is homogenized for 5 min under static vacuum with a butterfly stirrer (200 revolutions/min).

Example MC-2 (Comparison, MC-2, But Without Addition of the Polymer Compositions P2 According to the Invention, Without VTMO Desiccant)

A moisture-curing compositions based on silane-functional polymer SP was produced according to the following procedure: 578.8 g of Omyalite® 95 T (calcium carbonate, from Omya) filler, dried beforehand for 16 hours at 100° C. in an air circulation drying cabinet to a water content of 0.08% by weight, are dispersed with 136.2 g of plasticizer (Mesamoll®, from Lanxess, water content 0.03% by weight), 275.5 g of silane-functional polymer SP, 8.4 g of Cab-O-Sil® TS 720 (hydrophobic fumed silica, from Cabot, water content 0.11% by weight) and 3 g of 1,8-diazabicyclo[5.4.0]undec-7-ene (Sigma-Aldrich Co. LLC) in a laboratory dissolver with a butterfly stirrer (200 revolutions/min) and a dissolver disk (2500 revolutions/min) for 15 min under a static vacuum and with cooling. Static vacuum is to be understood here as meaning that the apparatus is evacuated down to a pressure of 200 mbar (dynamic vacuum) and the connection to the vacuum pump is then severed. Cooling was chosen such that during the entirety of production a temperature of 65° C. is not exceeded. Then, 1.0 g of aminopropyltrimethoxysilane (Dynasilan® AMMO, Evonik) are added and the mixture is homogenized for 5 min under static vacuum with a butterfly stirrer (200 revolutions/min).

Example MC-3 (Comparison, MC-1, But Without Addition of the Polymer Compositions P2 According to the Invention, With Addition of VTMO Desiccant and Aminosilane)

A moisture-curing compositions based on silane-functional polymer SP was produced according to the following procedure: 578.8 g of Omyalite® 95 T (calcium carbonate, from Omya) filler, dried beforehand for 16 hours at 100° C. in an air circulation drying cabinet to a water content of 0.08% by weight, are dispersed with 136.2 g of plasticizer (Mesamoll®, from Lanxess, water content 0.03% by weight), 275.5 g of silane-functional polymer SP, 8.4 g of Cab-O-Sil® TS 720 (hydrophobic fumed silica, from Cabot, water content 0.11% by weight) and 1.2 g of 1,8-diazabicyclo[5.4.0]undec-7-ene, and also 25.0 g of vinyltrimethoxysilane (Dynasilan® VTMO, Evonik) (Sigma-Aldrich Co. LLC) in a laboratory dissolver with a butterfly stirrer (200 revolutions/min) and a dissolver disk (2500 revolutions/min) for 15 min under a static vacuum and with cooling. Static vacuum is to be understood here as meaning that the apparatus is evacuated down to a pressure of 200 mbar (dynamic vacuum) and the connection to the vacuum pump is then severed. Cooling was chosen such that during the entirety of production a temperature of 65° C. is not exceeded. Then, 15.0 g of an oligomeric aminosilane (Dynasilan® 1146, Evonik) are added and the mixture is homogenized for 5 min under static vacuum with the butterfly stirrer (200 revolutions/min).

Determination of Viscosity, Shore Hardness, Elongation at Break and Tensile Strength After 7 days of storage in a cartridge the moisture-curing compositions were applied to a polyethylene film using a doctor blade to afford membranes having a uniform layer thickness of 2 mm and cured for 14 days at 23° C. and 50% atmospheric humidity, wherein after 7 days the membranes were detached from the film and turned over. The properties of these membranes were subsequently determined by the following methods.

Viscosity was determined after seven or 60 days of storage and was carried out according to the method in DIN DIN EN ISO 3219/B3 at a shear rate of 40/s, unless indicated otherwise.

Testing of Shore A hardness was carried out on the membranes according to the method in DIN ISO 7619-1. To determine Shore A hardness, three membranes were placed on top of one another to ensure a layer thickness of 6 mm.

Elongation at break and tensile strength were determined by means of a tensile test according to the method in DIN 53 504 on S2 dumbbells stamped from the membranes produced as described above using a shaped punch. The test speed was 200 mm/min.

Determination of the Skin Forming Time

Using a doctor blade (200 μm) a film of the adhesive is applied to a glass plate previously cleaned with ethyl acetate and is immediately placed in a drying recorder (BK 3 drying recorder BYK-Gardner). The needle was loaded with 10 g and moved over a distance of 35 cm over a period of 24 hours. The drying recorder was situated in a climate-controlled room at 23° C. and 50% relative atmospheric humidity. The time of disappearance of the permanent trace of the needle from the film was specified as the skin forming time.

Determination of the Water Content

The water content was determined according to DIN EN ISO 15512:2017-03, method B2.

Determination of the Tensile Shear Strength

The tensile shear strength was determined according to DIN EN 14293, storage sequence b).

TABLE 3

| Moisture-curing composition | MC-1 | MC-2 CE | MC-3 CE |
|---|---|---|---|
| Silane-functional polymer SP [g] | 267.2 | 275.5 | 275.5 |
| MESAMOLL ® [g] | 132.2 | 136.2 | 136.2 |
| CAB-O-SIL ® TS 720 [g] | 8.1 | 8.4 | 8.4 |
| OMYALITE ® 95T [g] | 516.6 | 578.8 | 578.8 |
| DBU [g] | 3.0 | 3.0 | 1.2 |
| Dynasilan ® VTMO [g] | — | — | 25.0 |
| Polymer composition P1 [g] | 56.0 | — | — |
| Polymer composition P2 [g] | — | — | — |
| Dynasilan ® 1146 [g] | — | — | 15.0 |
| Dynasilan ® AMMO [g] | 1.0 | 1.0 | — |
| State immediately after production | Paste-like | Paste-like | Paste-like |
| State 1 d after production | Paste-like | gelled | Paste-like |
| State 7 d after production | Paste-like | gelled | Paste-like |
| Skin forming time after 7 d of storage at 23° C. [min] | 10 | gelled | 60 |
| Skin forming time after 30 d of storage at 23° C. [min] | 10 | gelled | 60 |
| Tensile strength [N/mm²] | 1.8 | n.d. | 2.7 |
| Elongation at break [%] | 154 | n.d. | 170 |
| Shore A hardness | 57 | n.d. | 61 |
| Tensile shear strength according to DIN EN 14293 [N/mm²] | 1.7 | n.d. | 2.5 |

CE: Comparative example

The results show that use of the polymer composition P2 according to the invention, even without addition of drying agent and silane adhesion promoter, affords a storage-stable moisture-curing compositions MC-1 the properties of which in the fully reacted state are comparable with a comparative composition MC-3 obtained using drying agent and adhesion promoter. In contrast, dispensing with a drying agent and an adhesion promoter results in a moisture-curing composition MC-2 which is not storage-stable. The tensile shear strength according to DIN EN 14293 obtained with MC-1 is far above the profile of requirements for soft parquet adhesives in the DIN EN 14293 standard.

The invention claimed is:

1. A polymer composition produced by:
   a) reacting an NCO-reactive polymer having a molecular weight Mn of between 2000 and 25 000 g/mol and having exactly one NCO-reactive group per molecule with a diisocyanate, the molar ratio of the diisocyanate molecules to the NCO-reactive groups of the NCO-reactive polymer being at least 2:1;
   and subsequently
   b) reacting the remaining NCO groups in the reaction product from step a) with an NCO-reactive silane.

2. The polymer composition as claimed in claim 1, wherein the molar ratio of diisocyanate to NCO-reactive groups of the NCO-reactive polymer in step a) is 2:1 to 20:1.

3. The polymer composition as claimed in claim 1, wherein the NCO-reactive polymer has a number-average molecular weight of 4000 to 20 000 g/mol.

4. The polymer composition as claimed in claim 1, wherein the NCO-reactive polymer is a monool.

5. The polymer composition as claimed in claim 1, wherein the diisocyanate is selected from the group consisting of: 1,4-diisocyanatobutane, 1,5-diisocyanatopentane, hexamethylene 1,6-diisocyanate, 2-methyl-1,5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane, 1-isocyanato-1-methyl-4(3)-isocyanatomethylcyclohexane, 2,4'-diisocyanatodicyclohexylmethane, 4,4'-diisocyanatodicyclohexylmethane, 1,3-bis(isocyanatomethyl)cyclohexane, 1,4-bis(isocyanatomethyl)cyclohexane, bis(isocyanatomethyl)norbornane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7- diisocyanatoadamantane, 1,3-bis(isocyanatomethyl)benzene, 1,4-bis(isocyanatomethyl)benzene, 1,3-bis(1-isocyanato-1-methylethyl)benzene, 1,4-bis(1-isocyanato-1-methylethyl)benzene, bis(4-(1-isocyanato-1-methylethyl)phenyl) carbonate, 2,4-diisocyanatotoluene, 2,6-diisocyanatotoluene, 2,4'-diisocyanatodiphenylmethane, 4,4'-diisocyanatodiphenylmethane, 1,5-diisocyanatonaphthalene, and a mixture thereof.

6. The polymer composition as claimed in claim 1, wherein the NCO-reactive silane is a compound of formula (I):

where
$R^1$ each radical is in each case independently selected from $C_1$-$C_8$-alkyl, $C_6$-$C_{20}$-aryl, $C_1$-$C_8$-alkoxy, or $C_1$-$C_8$-acyloxy and at least one of the radicals $R^1$ is a $C_1$-$C_8$-alkoxy or $C_1$-$C_8$-acyloxy radical,
n is an integer from 1 to 4,
X is selected from —OH, —SH, and —NHR$^2$,
$R^2$ is selected from H, $C_1$-$C_{20}$-alkyl, —CH$_2$CH$_2$CN, and —CHR$^3$CH$_2$COOR$^4$,
$R^3$ is selected from H and —COOR$^4$, and
$R^4$ in each case is $C_1$-$C_{20}$-alkyl.

7. A process for producing the polymer composition as claimed in claim 1, comprising the steps of:
 a) reacting an NCO-reactive polymer having a molecular weight Mn of between 2000 and 25 000 g/mol and having exactly one NCO-reactive group per molecule with a diisocyanate, the molar ratio of the diisocyanate molecules to the NCO-reactive groups of the NCO-reactive polymer being at least 2:1;
 and subsequently
 b) reacting the remaining NCO groups in the reaction product from step a) with an NCO-reactive silane.

8. A moisture-curing composition comprising the polymer composition as claimed in claim 1 and at least one additive selected from the group consisting of: one or more fillers, one or more crosslinking catalysts, one or more adhesion promoters, and one or more plasticizers.

9. The moisture-curing composition as claimed in claim 8, wherein the moisture-curing composition has a water content, determined according to DIN EN ISO 15512:2017-03, method B2, of up to 0.1% by weight, based on the total weight of the moisture-curing composition.

10. The moisture-curing composition as claimed in claim 8, containing no further drying agents.

11. The moisture-curing composition as claimed in claim 8, comprising less than 1% by weight of vinyl group-containing silanes, based on the total weight of the moisture-curing composition.

12. The moisture-curing composition as claimed in claim 8, comprising
 5% to 50% by weight of the polymer composition as claimed in claims 1;
 10% to 70% by weight of at least one filler;
 up to 5% by weight of at least one adhesion promoter;
 0.001% to 5% by weight of at least one crosslinking catalyst; and
 up to 50% by weight of at least one plasticizer,
 based in each case on the total weight of the moisture-curing composition.

13. A process for producing a moisture-curing composition, comprising mixing the polymer composition as claimed in claim 1 with at least one filler, at least one adhesion promoter, at least one crosslinking catalyst, at least one plasticizer, or a combination thereof.

14. The process as claimed in claim 13, wherein the polymer composition as claimed in claim 1 is mixed with at least one filler having a water content of up to 1% by weight, based on the total weight of the filler.

15. The process as claimed in claim 13, wherein at most 1% by weight of vinyl group-containing silanes are added to the moisture-curing composition.

16. A drying agent for moisture-curing adhesives, sealants, or coating materials, comprising the polymer composition as claimed in claim 1.

17. A parquet adhesive containing the polymer composition as claimed in claim 1.

* * * * *